(12) United States Patent
Moorlag et al.

(10) Patent No.: US 8,509,669 B2
(45) Date of Patent: *Aug. 13, 2013

(54) SURFACE COATING AND FUSER MEMBER

(75) Inventors: Carolyn P. Moorlag, Mississauga (CA); Yu Qi, Oakville (CA); Nicoleta D. Mihai, Oakville (CA); Gordon Sisler, St. Catharines (CA); Sandra J. Gardner, Oakville (CA); Qi Zhang, Mississauga (CA); Nan-Xing Hu, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,418

(22) Filed: Mar. 22, 2011

(65) Prior Publication Data
US 2012/0245251 A1   Sep. 27, 2012

(51) Int. Cl.
G03G 15/20 (2006.01)
C08L 27/16 (2006.01)

(52) U.S. Cl.
USPC ........... 399/333; 428/421; 428/422; 524/413; 524/430; 524/492; 524/495; 524/544; 524/545; 524/546

(58) Field of Classification Search
USPC .................. 524/544–546; 399/333
See application file for complete search history.

(56) References Cited

U.S. PATENT DOCUMENTS

| | | | |
|---|---|---|---|
| 4,451,634 A | 5/1984 | Hatanaka et al. | |
| 4,711,818 A | 12/1987 | Henry | |
| 5,666,592 A | 9/1997 | Aslam et al. | |
| 5,709,973 A | 1/1998 | Chen et al. | |
| 5,716,750 A | 2/1998 | Tyagi et al. | |
| 5,887,235 A | 3/1999 | Wayman et al. | |
| 6,087,729 A | 7/2000 | Cerofolini et al. | |
| 6,101,345 A | 8/2000 | Van Goethem et al. | |
| 6,438,336 B1 | 8/2002 | Bengtson | |
| 6,927,006 B2 * | 8/2005 | Finn et al. | 430/124.35 |
| 6,983,119 B2 | 1/2006 | Nakayama | |
| 7,088,946 B2 | 8/2006 | Behnke et al. | |
| 7,395,021 B2 | 7/2008 | Tamura et al. | |
| 7,754,121 B2 | 7/2010 | Ristic-Lehmann et al. | |
| 8,029,871 B2 * | 10/2011 | Nakayama et al. | 427/515 |
| 8,135,324 B2 * | 3/2012 | Moorlag | 399/333 |
| 2001/0034158 A1 | 10/2001 | Matsubara | |
| 2005/0100728 A1 * | 5/2005 | Ristic-Lehmann et al. | 428/323 |
| 2008/0070041 A1 | 3/2008 | Kuntz et al. | |
| 2008/0311398 A1 | 12/2008 | Bauer et al. | |
| 2009/0247648 A1 * | 10/2009 | Zhao | 514/772 |
| 2010/0226701 A1 | 9/2010 | Moorlag | |
| 2012/0244469 A1 | 9/2012 | Zwartz et al. | |

OTHER PUBLICATIONS

Dow Corning VM 2270, Aerogel Fine Particles, Dow Corning Corporation, 2008.*

* cited by examiner

*Primary Examiner* — Nicole M Buie-Hatcher
(74) *Attorney, Agent, or Firm* — Hoffman Warnick LLC

(57) ABSTRACT

The present teachings disclose a surface coating. The surface coating includes a fluoroplastic having dispersed therein aerogel particles wherein the aerogel particles comprise from about 0.1 weight percent to about 25 weight percent of the surface coating. The surface coating is useful as an out layer for fuser members.

18 Claims, 5 Drawing Sheets

SURFACE COATING AND FUSER MEMBER

CROSS REFERENCE TO RELATED APPLICATIONS

This application relates to commonly assigned application Ser. No. 13,053,423, filed simultaneously herewith and incorporated by reference herein in its entirety.

BACKGROUND

1. Field of Use

This disclosure is generally directed to surface layers having a low surface energy and specifically to fuser members useful in electrophotographic imaging apparatuses, including digital, image on image, and the like.

2. Background

Very low surface-energy coatings are required in many industries for a broad range of applications, including non-stick cookery, anti-fouling of marine contaminants, self-cleaning windows and architectual materials, machinery coatings, mold release packaging, ink and toner packaging, anti-graffiti components, ink-jet prnting and oil-less printing. Very low surface-energy coatings are required for oil-less printing. Fillers have been added to low surface energy fluoroplastic materials such as PFA to modify the surface properties; however non-fluorinated material fillers often result in poor release performance. It would be desirable to have a filler material that improves surface properties of fuser topcoats.

In the electrophotographic printing process, a toner image can be fixed or fused upon a support (e.g., a paper sheet) using a fuser roller. Conventional fusing technologies apply release agents/fuser oils to the fuser roller during the fusing operation, in order to maintain good release properties of the fuser roller. For example, oil fusing technologies have been used for all high speed products in the entry production and production color market.

A coating having a low surface energy that is durable and easily manufactured is desirable.

SUMMARY

According to an embodiment, there is provided a surface coating comprising a fluoroplastic have dispersed therein aerogel particles wherein the surface coating comprises a surface energy of about 20 mN/m$^2$ of less.

According to another embodiment, there is described a fuser member comprising a substrate and a functional layer disposed on the substrate. An outer layer is disposed on the functional layer and comprises a fluoroplastic matrix having dispersed therein aerogel particles wherein a surface energy of the outer layer is less than about 20 mN/m$^2$.

According to another embodiment there is provided a fuser member comprising a substrate and an outer layer disposed on the substrate. The outer layer comprises a fluoroplastic matrix having dispersed therein aerogel particles wherein the aerogel particles comprise from about 1 weight percent to about 5 weight percent wherein a surface energy of the outer layer is less than about 10 mN/m$^2$.

BRIEF DESCRIPTION OF THE DRAWINGS

The accompanying drawings, which are incorporated in and constitute a part of this specification, illustrate several embodiments of the present teachings and together with the description, serve to explain the principles of the present teachings.

Figure 1:
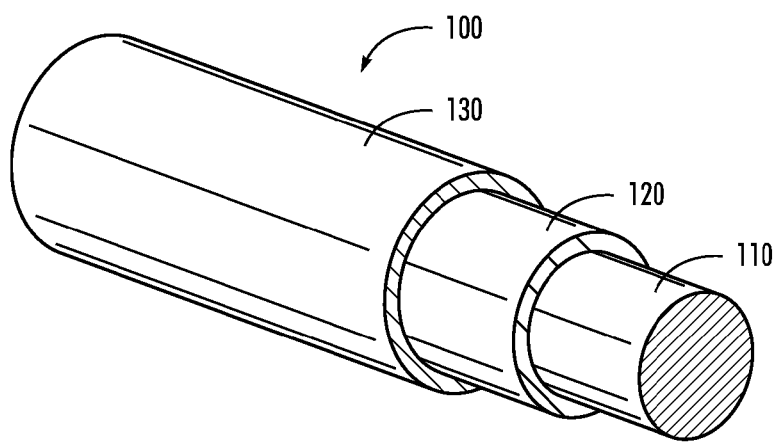
FIG. 1 depicts an exemplary fusing member having a cylindrical substrate in accordance with the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to embodiments of the present teachings, examples of which are illustrated in the accompanying drawings. Wherever possible, the same reference numbers will be used throughout the drawings to refer to the same or like parts.

In the following description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The following description is, therefore, merely exemplary.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g.–1, –2, –3, –10, –20, –30, etc.

Disclosed herein is surface layer having an extremely low surface energy. Very low surface energy coatings are required in many industries for a broad range of applications, including non-stick cookery, anti-fouling of marine contaminants, self-cleaning windows and architectual materials, machinery coatings, mold release packaging, ink and toner packaging, anti-graffiti components, ink jet prnting and oil-less printing. Fuser topcoats are required with very low surface energy for oil-less fusing. Fillers may be added to low surface energy materials such as PFA to modify the materials properties, but addition of non-fluorinated materials often results in poor release performance. A composite coating that improves surface properties is desirable for fusing and other applications is described herein. The surface layer described herein is characterized as superhydrophobic.

As used herein, the term "hydrophobic/hydrophobicity" and the term "oleophobic/oleophobicity" refer to the wettability behavior of a surface that has, e.g., a water and hexadecane (or hydrocarbons, silicone oils, etc.) contact angle of approximately 90° or more, respectively. For example, on a hydrophobic/oleophobic surface, a ~10-15 µL water/hexadecane drop can bead up and have an equilibrium contact angle of approximately 90° or greater.

As used herein, the term "ultrahydrophobicity/ultrahydrophobic surface" and the term "ultraoleophobic/ultraoleophobicity" refer to wettability of a surface that has a more restrictive type of hydrophobicity and oleophobicity, respectively. For example, the ultrahydrophobic/ultraoleophobic surface can have a water/hexadecane contact angle of about 120° or greater.

The term "superhydrophobicity/superhydrophobic surface" and the term "superoleophobic/superoleophobicity" refer to wettability of a surface that has a even more restrictive type of hydrophobicity and oleophobicity, respectively. For example, a superhydrophobic/superoleophobic surface can have a water/hexadecane contact angle of approximately 150 degrees or greater and have a ~10-15 µL water/hexadecane drop roll freely on the surface tilted a few degrees from level. The sliding angle of the water/hexadecane drop on a superhydrophobic/superoleophobic surface can be about 10 degrees or less. On a tilted superhydrophobic/superoleophobic surface, since the contact angle of the receding surface is high and since the interface tendency of the uphill side of the drop to stick to the solid surface is low, gravity can overcome the resistance of the drop to slide on the surface. A superhydrophobic/superoleophobic surface can be described as having a very low hysteresis between advancing and receding contact angles (e.g., 40 degrees or less). Note that larger drops can be more affected by gravity and can tend to slide easier, whereas smaller drops can tend to be more likely to remain stationary or in place.

As used herein, the term "low surface energy" and the term "very low surface energy" refer to ability of molecules to adhere to a surface. The lower the surface energy, the less likely a molecule will adhere to the surface. For example, the low surface energy is characterized by a value of about 20 $mN/m^2$ or less, very low surface energy is characterized by a value of about 10 $mN/m^2$ or less.

The fixing or fuser member can include a substrate having one or more functional layers formed thereon. The one or more functional layers includes a surface coating or top layer having a surface wettability that is hydrophobic and/or oleophobic; ultrahydrophobic and/or ultraoleophobic; or superhydrophobic and/or superoleophobic. Such a fixing member can be used as an oil-less fusing member for high speed, high quality electrophotographic printing to ensure and maintain a good toner release from the fused toner image on the supporting material (e.g., a paper sheet), and further assist paper stripping.

In various embodiments, the fixing member can include, for example, a substrate, with one or more functional layers formed thereon. The substrate can be formed in various shapes, e.g., a cylinder (e.g., a cylinder tube), a cylindrical drum, a belt, or a film, using suitable materials that are non-conductive or conductive depending on a specific configuration, for example, as shown in FIGS. 1 and 2.

Figure 2:
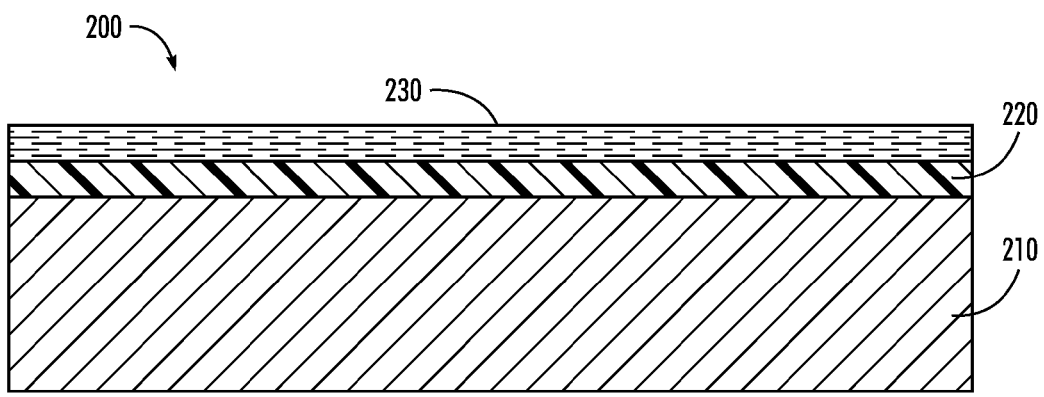
FIG. 2 depicts an exemplary fusing member having a belt substrate in accordance with the present teachings.

Specifically, FIG. 1 depicts an exemplary fixing or fusing member 100 having a cylindrical substrate 110 and FIG. 2 depicts another exemplary fixing or fusing member 200 having a belt substrate 210 in accordance with the present teachings. It should be readily apparent to one of ordinary skill in the art that the fixing or fusing member 100 depicted in FIG. 1 and the fixing or fusing member 200 depicted in FIG. 2 represent generalized schematic illustrations and that other layers/substrates can be added or existing layers/substrates can be removed or modified.

In FIG. 1 the exemplary fixing member 100 can be a fuser roller having a cylindrical substrate 110 with one or more functional layers 120 (also referred to as intermediate layers) and an outer layer 130 formed thereon. In various embodiments, the cylindrical substrate 110 can take the form of a cylindrical tube, e.g., having a hollow structure including a heating lamp therein, or a solid cylindrical shaft. In FIG. 2, the exemplary fixing member 200 can include a belt substrate 210 with one or more functional layers, e.g., 220 and an outer surface 230 formed thereon. The belt substrate 210 and the cylindrical substrate 110 can be formed from, for example, polymeric materials (e.g., polyimide, polyaramide, polyether ether ketone, polyetherimide, polyphthalamide, polyamide-imide, polyketone, polyphenylene sulfide, fluoropolyimides or fluoropolyurethanes) and metal materials (e.g., aluminum or stainless steel) to maintain rigidity and structural integrity as known to one of ordinary skill in the art.

Examples of functional layers 120 and 220 include fluorosilicones, silicone rubbers such as room temperature vulcanization (RTV) silicone rubbers, high temperature vulcanization (HTV) silicone rubbers, and low temperature vulcanization (LTV) silicone rubbers. These rubbers are known and readily available commercially, such as SILASTIC® 735 black RTV and SILASTIC® 732 RTV, both from Dow Corning; 106 RTV Silicone Rubber and 90 RTV Silicone Rubber, both from General Electric; and JCR6115CLEAR HTV and SE4705U HTV silicone rubbers from Dow Corning Toray Silicones. Other suitable silicone materials include the siloxanes (such as polydimethylsiloxanes); fluorosilicones such as Silicone Rubber 552, available from Sampson Coatings, Richmond, Va.; liquid silicone rubbers such as vinyl crosslinked heat curable rubbers or silanol room temperature crosslinked materials; and the like. Another specific example is Dow Corning Sylgard 182. Commercially available LSR rubbers include Dow Corning Q3-6395, Q3-6396, SILASTIC® 590 LSR, SILASTIC® 591 LSR, SILASTIC® 595 LSR, SILASTIC® 596 LSR, and SILASTIC® 598 LSR from Dow Corning. The functional layers provide elasticity and can be mixed with inorganic particles, for example SiC or $Al_2O_3$, as required.

Examples of functional layers 120 and 220 also include fluoroelastomers. Fluoroelastomers are from the class of 1) copolymers of two of vinylidenefluoride, hexafluoropropylene, and tetrafluoroethylene; such as those known commercially as VITON A®, 2) terpolymers of vinylidenefluoride, hexafluoropropylene, and tetrafluoroethylene such as those known commercially as VITON B®; and 3) tetrapolymers of vinylidenefluoride, hexafluoropropylene, tetrafluoroethylene, and a cure site monomer, such as those known commercially as VITON GH® or VITON GF®. These fluoroelastomers are known commercially under various designations such as those listed above, along with VITON E®, VITON E 60C®, VITON E430®, VITON 910®, and VITON ETP®. The VITON® designation is a trademark of E.I. DuPont de Nemours, Inc. The cure site monomer can be 4-bromoperfluorobutene-1,1,1-dihydro-4-bromoperfluorobutene-1, 3-bromoperfluoropropene-1,1,1-dihydro-3-bromoperfluoropropene-1, or any other suitable, known cure site monomer, such as those commercially available from DuPont. Other commercially available fluoropolymers include FLUOREL 2170®, FLUOREL 2174®, FLUOREL 2176®, FLUOREL 2177® and FLUOREL LVS 76®, FLUOREL® being a registered trademark of 3M Company. Additional commercially available materials include AFLAS™ a poly(propylene-tetrafluoroethylene), and FLUOREL II® (LII900) a poly(propylene-tetrafluoroethylenevinylidenefluoride), both also available from 3M Company, as well as the Tecnoflons identified as FOR-60KIR®, FOR-LHF®, NM® FOR-THF®, FOR-TFS® TH® NH®, P757® TNS®, T439® PL958® BR9151® and TN505®, available from Ausimont.

The fluoroelastomers VITON GH® and VITON GF® have relatively low amounts of vinylidenefluoride. The VITON GF® and VITON GH® have about 35 weight percent of vinylidenefluoride, about 34 weight percent of hexafluoropropylene, and about 29 weight percent of tetrafluoroethylene, with about 2 weight percent cure site monomer.

For a roller configuration, the thickness of the functional layer can be from about 0.5 mm to about 10 mm, or from about 1 mm to about 8 mm, or from about 2 mm to about 7 mm. For a belt configuration, the functional layer can be from about 25 microns up to about 2 mm, or from 40 microns to about 1.5 mm, or from 50 microns to about 1 mm.

An exemplary embodiment of a release layer 130 or 230 includes fluoroplastics having aeorgel particles dispersed therein. Examples of fluoroplastics include polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP), and mixtures thereof. The fluoroplastics provide chemical and thermal stability and have a low surface energy. The fluoroplastics have a melting temperature of from about 255° C. to about 360° C. or from about 280° C. to about 330° C.

For the fuser member 200, the thickness of the outer surface layer or release layer 230 can be from about 10 microns to about 100 microns, or from about 20 microns to about 80 microns, or from about 30 microns to about 50 microns.

Additives and additional conductive or non-conductive fillers may be present in the intermediate layer substrate layers 110 and 210, the intermediate layers 220 and 230 and the release layers 130 and 230. In various embodiments, other filler materials or additives including, for example, inorganic particles, can be used for the coating composition and the subsequently formed surface layer. Conductive fillers used herein may include carbon blacks such as carbon black, graphite, fullerene, acetylene black, fluorinated carbon black, and the like; carbon nanotubes; metal oxides and doped metal oxides, such as tin oxide, antimony dioxide, antimony-doped tin oxide, titanium dioxide, indium oxide, zinc oxide, indium oxide, indium-doped tin trioxide, and the like; and mixtures thereof. Certain polymers such as polyanilines, polythiophenes, polyacetylene, poly(p-phenylene vinylene), poly (p-phenylene sulfide), pyrroles, polyindole, polypyrene, polycarbazole, polyazulene, polyazepine, poly(fluorine), polynaphthalene, salts of organic sulfonic acid, esters of phosphoric acid, esters of fatty acids, ammonium or phosphonium salts and mixtures thereof can be used as conductive fillers. In various embodiments, other additives known to one of ordinary skill in the art can also be included to form the disclosed composite materials.

Optionally, any known and available suitable adhesive layer may be positioned between the outer layer or outer surface, the functional layer and the substrate. The adhesive layer can be coated on the substrate, or on the outer layer, to a thickness of from about 2 nanometers to about 10,000 nanometers, or from about 2 nanometers to about 1,000 nanometers, or from about 2 nanometers to about 5000 nanometers. The adhesive can be coated by any suitable known technique, including spray coating or wiping.

Figure 3A:
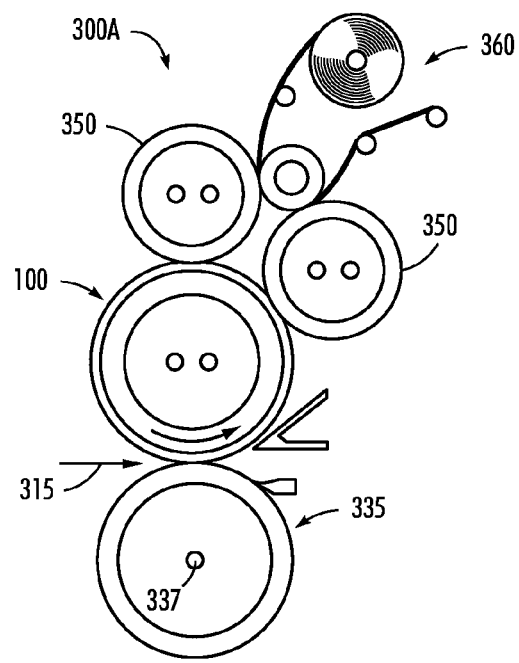
FIGS. 3A-3B depict exemplary fusing configurations using the fuser rollers shown in FIG. 1 in accordance with the present teachings.
Figure 3B:
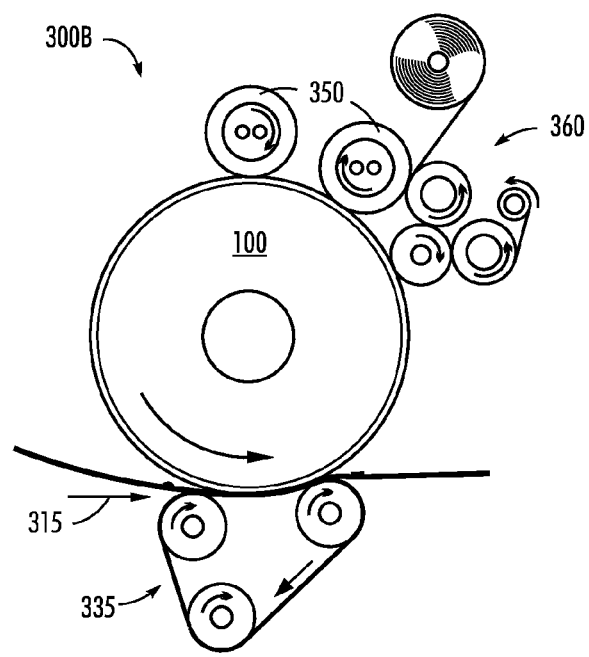
Figure 4A:
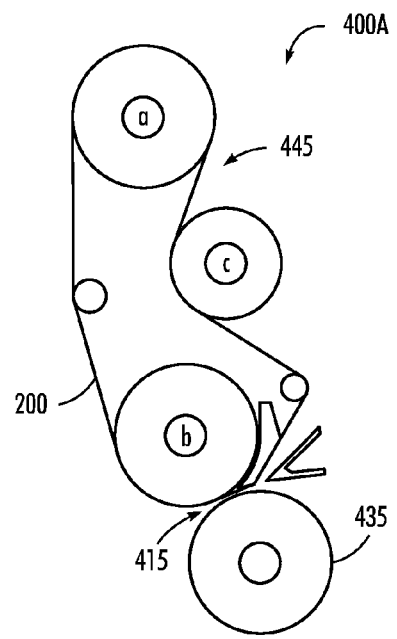
FIGS. 4A-4B depict another exemplary fusing configurations using the fuser belt shown in FIG. 2 in accordance with the present teachings.
Figure 4B:
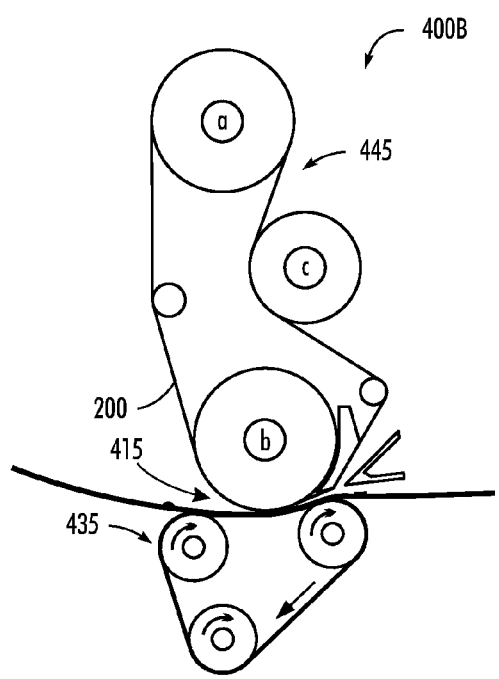

FIGS. 3A-4B and FIGS. 4A-4B depict exemplary fusing configurations for the fusing process in accordance with the present teachings. It should be readily apparent to one of ordinary skill in the art that the fusing configurations 300A-B depicted in FIGS. 3A-3B and the fusing configurations 400A-B depicted in FIGS. 4A-4B represent generalized schematic illustrations and that other members/layers/substrates/configurations can be added or existing members/layers/substrates/configurations can be removed or modified. Although an electrophotographic printer is described herein, the disclosed apparatus and method can be applied to other printing technologies. Examples include offset printing and inkjet and solid transfix machines.

FIGS. 3A-3B depict the fusing configurations 300A-B using a fuser roller shown in FIG. 1 in accordance with the present teachings. The configurations 300A-B can include a fuser roller 100 (i.e., 100 of FIG. 1) that forms a fuser nip with a pressure applying mechanism 335, such as a pressure roller in FIG. 3A or a pressure belt in FIG. 3B, for an image supporting material 315. In various embodiments, the pressure applying mechanism 335 can be used in combination with a heat lamp 337 to provide both the pressure and heat for the fusing process of the toner particles on the image supporting material 315. In addition, the configurations 300A-B can include one or more external heat roller 350 along with, e.g., a cleaning web 360, as shown in FIG. 3A and FIG. 3B.

FIGS. 4A-4B depict fusing configurations 400A-B using a fuser belt shown in FIG. 2 in accordance with the present teachings. The configurations 400A-B can include a fuser belt 200 (i.e., 200 of FIG. 2) that forms a fuser nip with a pressure applying mechanism 435, such as a pressure roller in FIG. 4A or a pressure belt in FIG. 4B, for a media substrate 415. In various embodiments, the pressure applying mechanism 435 can be used in a combination with a heat lamp to provide both the pressure and heat for the fusing process of the toner particles on the media substrate 415. In addition, the configurations 400A-B can include a mechanical system 445 to move the fuser belt 200 and thus fusing the toner particles and forming images on the media substrate 415. The mechanical system 445 can include one or more rollers 445a-c, which can also be used as heat rollers when needed.

Figure 5:
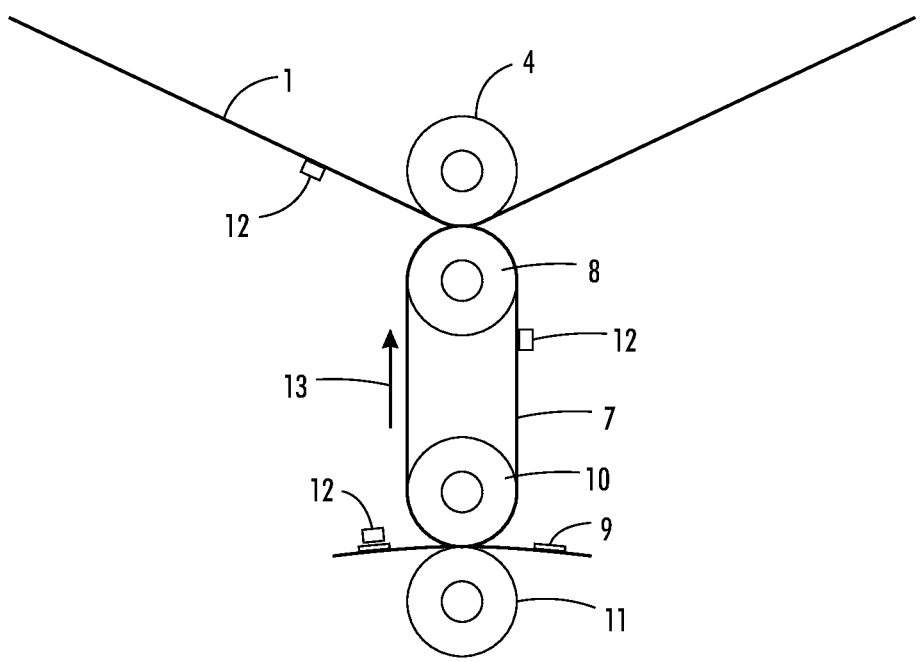
FIG. 5 depicts an exemplary fuser configuration using a transfix apparatus.

FIG. 5 demonstrates a view of an embodiment of a transfix member 7 which may be in the form of a belt, sheet, film, or like form. The transfix member 7 is constructed similarly to the fuser belt 200 described above. The developed image 12 positioned on intermediate transfer member 1 is brought into contact with and transferred to transfix member 7 via rollers 4 and 8. Roller 4 and/or roller 8 may or may not have heat associated therewith. Transfix member 7 proceeds in the direction of arrow 13. The developed image is transferred and fused to a copy substrate 9 as copy substrate 9 is advanced between rollers 10 and 11. Rollers 10 and/or 11 may or may not have heat associated therewith.

A composite surface coating that improves surface properties including superhydrophobicity is described. The fluoroplastics listed earlier (e.g. PFA Teflon, PTFE Teflon, FEP, etc) exhibit excellent properties for a fuser top coat; however, it would be desirable to increase the hydrophobicity and lower the brittleness of such top coats.

Aerogel/fluoroplastic composite coatings produce a superhydrophobic surface capable of very low surface energy. The addition of aerogel to a fluoroplastic coating increases the modulus, and allows the opportunity to modify the materials' properties without increasing the surface energy (such as would be the case with the addition of carbon black or other hard filler particles).

Aerogels may be described, in general terms, as gels that have been dried to a solid phase by removing pore fluid and replacing the pore fluid with air. As used herein, an "aerogel" refers to a material that is generally a very low density ceramic solid, typically formed from a gel. The term "aerogel" is thus used to indicate gels that have been dried so that the gel shrinks little during drying, preserving its porosity and related characteristics. In contrast, "hydrogel" is used to describe wet gels in which pore fluids are aqueous fluids. The term "pore fluid" describes fluid contained within pore structures during formation of the pore element(s). Upon drying, such as by supercritical drying, aerogel particles are formed that contain a significant amount of air, resulting in a low density solid and a high surface area. In various embodiments, aerogels are thus low-density microcellular materials characterized by low mass densities, large specific surface areas and very high porosities. In particular, aerogels are characterized by their unique structures that comprise a large number of small inter-connected pores. After the solvent is removed, the polymerized material is pyrolyzed in an inert atmosphere to form the aerogel.

Any suitable aerogel component can be used. In embodiments, the aerogel component can be, for example, selected from inorganic aerogels, organic aerogels, carbon aerogels, and mixtures thereof. In particular embodiments, ceramic aerogels can be suitably used. These aerogels are typically composed of silica, but may also be composed of metal oxides, such as alumina, titania and zirconia, or carbon, and can optionally be doped with other elements such as a metal. In some embodiments, the aerogel component can comprise aerogels chosen from polymeric aerogels, colloidal aerogels, and mixtures thereof.

The aerogel component can be either formed initially as the desired sized particles, or can be formed as larger particles and then reduced in size to the desired size. For example, formed aerogel materials can be ground, or they can be directly formed as nano to micron sized aerogel particles.

Aerogel particles of embodiments may have porosities of from about 50 percent to about 99.9 percent, in which the aerogel can contain 99.9 percent empty space. In embodiments the aerogel particles have porosities of from about 50 percent to about 99.0 percent, or from 50 percent to about 98 percent. In embodiments, the pores of aerogel components may have diameters of from about 2 nm to about 500 nm, or from about 10 nm to about 400 nm or from about 20 nm to about 100 nm. In particular embodiments, aerogel components may have porosities of more than 50% pores with diameters of less than 100 nm and even less than about 20 nm. In embodiments, the aerogel components may be in the form of particles having a shape that is spherical, or near-spherical, cylindrical, rod-like, bead-like, cubic, platelet-like, and the like.

In embodiments, the aerogel components include aerogel particles, powders, or dispersions ranging in average volume particle size of from about 1 µm to about 100 µm, or about 3 µm to about 50 µm, or about 5 µm to 20 µm. The aerogel components can include aerogel particles that appear as well dispersed single particles or as agglomerates of more than one particle or groups of particles within the polymer material.

Generally, the type, porosity, pore size, and amount of aerogel used for a particular embodiment may be chosen based upon the desired properties of the resultant composition and upon the properties of the polymers and solutions thereof into which the aerogel is being combined. For example, if a pre-polymer (such as a low molecular weight polyurethane monomer that has a relatively low process viscosity, for example less than 10 centistokes) is chosen for use in an embodiment, then a high porosity, for example greater than 80%, and high specific surface area, for example greater than about 500 m$^2$/gm, aerogel having relatively small pore size, for example less than about 100 nm, may be mixed at relatively high concentrations, for example greater than about 2 weight percent to about 20 weight percent, into the pre-polymer by use of moderate-to-high energy mixing techniques, for example by controlled temperature, high shear and/or blending. If a hydrophilic-type aerogel is used, upon cross-linking and curing/post curing the pre-polymer to form an infinitely long matrix of polymer and aerogel filler, the resultant composite may exhibit improved hydrophobicity and increased hardness when compared to a similarly prepared sample of unfilled polymer. The improved hydrophobicity may be derived from the polymer and aerogel interacting during the liquid-phase processing whereby a portion of the molecular chain of the polymer interpenetrates into the pores of the aerogel and the non-pore regions of the aerogel serves to occupy some or all of the intermolecular space where water molecules could otherwise enter and occupy.

The continuous and monolithic structure of interconnecting pores that characterizes aerogel components also leads to high surface areas and, depending upon the material used to make the aerogel, the electrical conductivity may range from highly thermally and electrically conducting to highly thermally and electrically insulating. Further, aerogel components in embodiments may have surface areas ranging from about 400 m$^2$/g to about 1200 m$^2$/g, such as from about 500 m$^2$/g to about 1200 m$^2$/g, or from about 700 m$^2$/g to about 900 m$^2$/g. In embodiments, aerogel components may have electrical resistivities greater than about $1.0 \times 10^{-4}$ Ω-cm, such as in a range of from about 0.01 Ω-cm to about $1.0 \times 10^{16}$ Ω-cm, from about 1 Ω-cm to about $1.0 \times 10^8$ Ω-cm, or from about 50 Ω-cm to about 750,000 Ω-cm. Different types of aerogels used in various embodiments may also have electrical resistivities that span from conductive, about 0.01 to about 1.00 Ω-cm, to insulating, more than about $10^{16}$ Ω-cm. Conductive aerogels of embodiments, such as carbon aerogels, may be combined with other conductive fillers to produce combinations of physical, mechanical, and electrical properties that are otherwise difficult to obtain.

Aerogels that can suitably be used in embodiments may be divided into three major categories: inorganic aerogels, organic aerogels and carbon aerogels. In embodiments, the fuser member layer may contain one or more aerogels chosen from inorganic aerogels, organic aerogels, carbon aerogels and mixtures thereof. For example, embodiments can include multiple aerogels of the same type, such as combinations of two or more inorganic aerogels, combinations of two or more organic aerogels, or combinations of two or more carbon aerogels, or can include multiple aerogels of different types, such as one or more inorganic aerogels, one or more organic aerogels, and/or one or more carbon aerogels. For example, a chemically modified, hydrophobic silica aerogel may be combined with a high electrical conductivity carbon aerogel to simultaneously modify the hydrophobic and electrical properties of a composite and achieve a desired target level of each property.

Inorganic aerogels, such as silica aerogels, are generally formed by sol-gel polycondensation of metal oxides to form highly cross-linked, transparent hydrogels. These hydrogels are subjected to supercritical drying to form inorganic aerogels.

Organic aerogels are generally formed by sol-gel polycondensation of resorcinol and formaldehyde. These hydrogels are subjected to supercritical drying to form organic aerogels.

Carbon aerogels are generally formed by pyrolyzing organic aerogels in an inert atmosphere. Carbon aerogels are composed of covalently bonded, nanometer-sized particles that are arranged in a three-dimensional network. Carbon aerogels, unlike high surface area carbon powders, have oxygen-free surfaces, which can be chemically modified to increase their compatibility with polymer matrices. In addition, carbon aerogels are generally electrically conductive, having electrical resistivities of from about 0.005 $\Omega$-cm to about 1.00 $\Omega$-cm. In particular embodiments, the composite may contain one or more carbon aerogels and/or blends of one or more carbon aerogels with one or more inorganic and/or organic aerogels.

Carbon aerogels that may be included in embodiments exhibit two morphological types, polymeric and colloidal, which have distinct characteristics. The morphological type of a carbon aerogel depends on the details of the aerogel's preparation, but both types result from the kinetic aggregation of molecular clusters. That is, nanopores, primary particles of carbon aerogels that may be less than 20 Å (Angstroms) and that are composed of intertwined nanocrystalline graphitic ribbons, cluster to form secondary particles, or mesopores, which may be from about 20 Å to about 500 Å. These mesopores can form chains to create a porous carbon aerogel matrix. The carbon aerogel matrix may be dispersed, in embodiments, into polymeric matrices by, for example, suitable melt blending or solvent mixing techniques.

In embodiments, carbon aerogels may be combined with, coated, or doped with a metal to improve conductivity, magnetic susceptibility, and/or dispersibility. Metal-doped carbon aerogels may be used in embodiments alone or in blends with other carbon aerogels and/or inorganic or organic aerogels. Any suitable metal, or mixture of metals, metal oxides and alloys may be included in embodiments in which metal-doped carbon aerogels are used. In particular embodiments, and in specific embodiments, the carbon aerogels may doped with one or more metals chosen from transition metals (as defined by the Periodic Table of the Elements) and aluminum, zinc, gallium, germanium, cadmium, indium, tin, mercury, thallium and lead. In particular embodiments, carbon aerogels are doped with copper, nickel, tin, lead, silver, gold, zinc, iron, chromium, manganese, tungsten, aluminum, platinum, palladium, and/or ruthenium. For example, in embodiments, copper-doped carbon aerogels, ruthenium-doped carbon aerogels and mixtures thereof may be included in the composite.

For example as noted earlier, in embodiments in which the aerogel components comprise nanometer-scale particles, these particles or portions thereof can occupy inter- and intra-molecular spaces within the molecular lattice structure of the polymer, and thus can prevent water molecules from becoming incorporated into those molecular-scale spaces. Such blocking may decrease the hydrophilicity of the overall composite. In addition, many aerogels are hydrophobic. Incorporation of hydrophobic aerogel components may also decrease the hydrophilicity of the composites of embodiments. Composites having decreased hydrophilicity, and any components formed from such composites, have improved environmental stability, particularly under conditions of cycling between low and high humidity.

The aerogel particles can include surface functionalities selected from the group of alkylsilane, alkylchlorosilane, alkylsiloxane, polydimethylsiloxane, aminosilane and methacrylsilane. In embodiments, the surface treatment material that contains functionality reactive to aerogel that will result in modified surface interactions. Surface treatment also helps enable non-stick interaction on the composition surface.

In addition, the porous aerogel particles may interpenetrate or intertwine with the fluoroplastic and thereby strengthen the polymeric lattice. The mechanical properties of the overall composite of embodiments in which aerogel particles have interpenetrated or interspersed with the polymeric lattice may thus be enhanced and stabilized.

For example, in one embodiment, the aerogel component can be a silica silicate having an average particle size of 5-15 microns, a porosity of 90% or more, a bulk density of 40-100 kg/m$^3$, and a surface area of 600-800 m$^2$/g. Of course, materials having one or properties outside of these ranges can be used, as desired.

Depending upon the properties of the aerogel components, the aerogel components can be used as is, or they can be chemically modified. For example, aerogel surface chemistries may be modified for various applications, for example, the aerogel surface may be modified by chemical substitution upon or within the molecular structure of the aerogel to have hydrophilic or hydrophobic properties. For example, chemical modification may be desired so as to improve the hydrophobicity of the aerogel components. When such chemical treatment is desired, any conventional chemical treatment well known in the art can be used. For example, such chemical treatments of aerogel powders can include replacing surface hydroxyl groups with organic or partially fluorinated organic groups, or the like.

In general, a wide range of aerogel components are known in the art and have been applied in a variety of uses. For example, many aerogel components, including ground hydrophobic aerogel particles, have been used as low cost additives in such formulations as hair, skincare, and antiperspirant compositions. One specific non-limiting example is the commercially available powder that has already been chemically treated, Dow Corning VM-2270 Aerogel fine particles having a size of about 5-15 microns.

In embodiments, the surface coating may comprise at least the above-described aerogel that is at least one of dispersed in or bonded to the fluoroplastic component. In particular embodiments, the aerogel is uniformly dispersed in and/or bonded to the fluoroplastic component, although non-uniform dispersion or bonding can be used in embodiments to achieve specific goals. For example, in embodiments, the aerogel can be non-uniformly dispersed or bonded in the fluoroplastic component to provide a high concentration of the aerogel in surface layers, substrate layers, different portions of a single layer, or the like.

Any suitable amount of the aerogel may be incorporated into the fluoroplastic component, to provide desired results. For example, the coating layer may be formed from about 0.1 weight percent to about 25 weight percent aerogel of the total weight of the surface coating, or from about 0.5 weight percent to about 15 weight percent aerogel of the total weight of the surface coating or from about 1 weight percent to about 10 weight percent of the total weight of the surface coating. The size of aerogel particles is from about 1 μm to about 100 μm, or about 3 μm to about 50 μm, or about 5 μm to 20 μm.

The surface coating has a surface free energy that is less than the surface energy of a fluoroplastic base layer that is used in the composite. This depends on the fluoroplastic. In embodiments fluoroplastics with aerogel particles dispersed therein produce a surface layer having a surface energy of less than 20 mN/m$^2$. In embodiments the surface free energy is less than 10 mN/m$^2$ for a superhydrophobic surface, or between 10 mN/m$^2$ and 2 mN/m$^2$, or is between 10 mN/m$^2$ and 5 mN/m$^2$, or is between 10 mN/m$^2$ and 7 mN/m$^2$.

Figure 6:
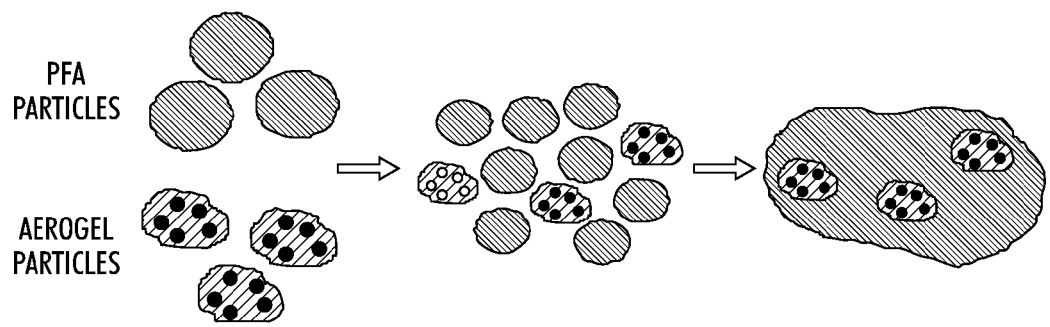
FIG. 6 shows a composite aerogel/PFA processing.

Fluoroplastics such as Teflon and PFA are commonly processed from powders and then brought to melting temperature (350-400° C.) to form a coherent coating. When aerogel and fluoroplastic particles are combined and brought to melting temperature, a fused fluororesin matrix is produced with embedded aerogel particles. FIG. 6 shows a schematic for PFA powder and aerogel powder combined to form a composite coating. Possible methods of processing aerogel/fluoroplastic composite coatings include powder coating, spray coating from solvent dispersion, and sleeve coating. The layer incorporates aerogel fillers particles dispersed throughout a fluoroplastic matrix in ratios of 0.1% to 25%. In embodiments the aerogel amount was from 1% to 5%.

The composition of fluoroplastic and aerogel is coated on a substrate to form a surface layer in any suitable known manner. Typical techniques for coating such materials on the substrate layer include flow coating, liquid spray coating, dip coating, wire wound rod coating, fluidized bed coating, powder coating, electrostatic spraying, sonic spraying, blade coating, molding, laminating, and the like.

Specific embodiments will now be described in detail. These examples are intended to be illustrative, and not limited to the materials, conditions, or process parameters set forth in these embodiments. All parts are percentages by solid weight unless otherwise indicated.

EXAMPLES

Silica silicate VM2270 aerogel powder was obtained from Dow Corning. The powder contained 5-15 micron particles having greater than 90% porosity, 40-100 kg/m$^3$ bulk density, and 600-800 m$^2$/g surface area. SEM microscopy performed on powder particles confirms particle size of ~10 microns for individual particles, with nanofeatures on the particles of ~20 nm.

Coating formulations were prepared by dispersing MP320 powder PFA from DuPont (particle size greater than 15 microns) and VM2270 silica aerogel powder in 2-propanol with a total solids loading of 20 weight percent. Aerogel was incorporated in a ratio ranging from 0 weight percent to 5 weight percent of total solids. Dispersion of the powders in 2-propanol was aided by repeated sonnication. Dispersions were then sprayed onto a silicone rubber substrate using a Paashe airbrush. The coatings were cured by heat treatment at 350° C. for 15-20 minutes. The morphology formed at the surface of composite PFA/Aerogel coatings. There was an observable trend of increasing surface texture with higher aerogel loading.

Figure 7:
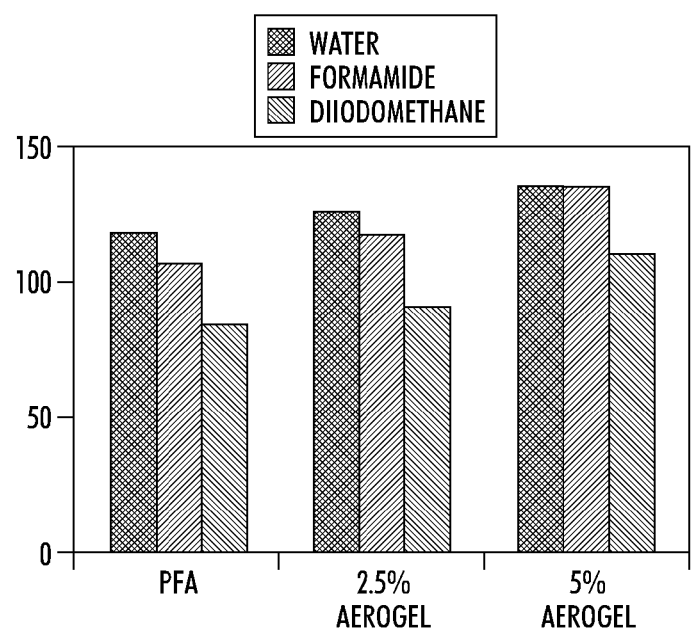
FIG. 7 shows contact angles of surface coatings described herein.

Surface energy measurements display a trend of increasing contact angles of water, formamide and diiodomethane with aerogel incorporation. The surface energy correspondingly decreases with increased aerogel loading to well below that of PFA, shown in FIG. 7. The low surface energy obtained for the 5% Aerogel sample suggests significant surface energy modification due to the highly textured mophology of the surface. The nano- and microstructure of the aerogel particles contrbute to the hierarchical character of the surface morphology.

Mechanical properties have been characterized at room temperature by mechanical testing of 65-100 micron thick coatings of aerogel/PFA composites. Composite powders were dispersed at 20 weight percent solids loading in 2-propanol and spray-coated to the desired thickness with a Paashe airbrush onto metal substrates. After heat treatment at 350° C. for 20 minutes, free-standing thick films were peeled from metal substrates for testing.

Mechanical testing was carried out using an Instron Model 3367, using test method ASTM D638 (plastics) at 23° C. with a ASTM mini-dogbone cutout. Results demonstrate that with 2.5% aerogel incorporation, very little change in mechanical properties is observed compared with PFA as shown in Table 1 below.

TABLE 1

| Sample | Tensile Stress (psi) | Tensile Strain (%) | Modulus (psi) | Toughness (in*lb/in$^3$) |
| --- | --- | --- | --- | --- |
| PFA | 3644 | 263 | 56,723 | 6303 |
| PFA/2.5% Aerogel | 3404 | 263 | 52,597 | 6033 |

Fluoroplastic/aerogel composite coatings have been prepared displaying superhydrophobicity, with a surface energy of 8.5 mN/m$^2$. Composite coatings may be prepared by various processing techniques on various substrates requiring a non-stick surface, including silicone, metals, or other plastics. Surface energy of composites decreases with increasing incorporation of aerogel particles. The combination of low-surface energy aerogel and PFA materials, combined with surface texturing in the nano- to micro-sized regime, produces superhydrophobic surface coatings useful for non-stick applications It will be appreciated that variants of the above-disclosed and other features and functions or alternatives thereof may be combined into other different systems or applications. Various presently unforeseen or unanticipated alternatives, modifications, variations, or improvements therein may be subsequently made by those skilled in the art, which are also encompassed by the following claims.

What is claimed is:

1. A surface coating comprising a fluoroplastic have dispersed therein aerogel particles wherein the aerogel particles comprise from about 0.1 weight percent to about 25weight percent of the surface coating, and wherein the surface coating comprises a surface energy of about 20 mN/m$^2$ or less.

2. The surface coating of claim 1, wherein the surface coating comprises a surface energy of about 10 mN/m$^2$ or less.

3. The surface coating of claim 1, wherein the fluoroplastic is selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

4. The surface coating of claim 1, wherein the aerogel particles comprise a material selected from the group consisting of silica, carbon, alumina, titania and zirconia.

5. The surface coating of claim 1, wherein the aerogel particles comprise a surface area of from about 400 $m^2/g$ to about 1200 $m^2/g$.

6. The surface coating of claim 1, wherein the aerogel particles comprise a particle size of from about 1 μm to about 100 μm.

7. The surface coating of claim 1, wherein the aerogel particles comprise a porosity of from about 50 percent to about 99.9 percent.

8. The surface coating of claim 1, wherein the aerogel particles comprise surface functionalities selected from the group consisting of alkylsilane, alkylchlorosilane, alkylsiloxane, polydimethylsiloxane, aminosilane and methacrylsilane.

9. A fuser member comprising:
a substrate;
an intermediate layer disposed on the substrate; and
an outer layer disposed on the intermediate layer wherein the outer layer comprises a fluoroplastic matrix having dispersed therein aerogel particles wherein the aerogel particles comprise from about 0.1 weight percent to about 25 weight percent of the outer layer, and wherein a surface energy of the outer layer is less than about 20 $mN/m^2$.

10. The fuser member of claim 9, wherein the surface energy is less than about 10 $mN/m^2$.

11. The fuser member of claim 9, wherein the fluoroplastic is selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

12. The fuser member of claim 9, wherein the aerogel particles comprise a material selected from the group consisting of silica, carbon, alumina, titania and zirconia.

13. The fuser member of claim 9, wherein the aerogel particles comprises a surface area of from about 400 $m^2/g$ to about 1200 $m^2/g$.

14. The fuser member of claim 9, wherein the aerogel particles comprise a particle size of from about 1 μm to about 100 μm.

15. The fuser member of claim 9, wherein the aerogel particles comprise a porosity of from about 50 percent to about 99.9 percent.

16. A fuser member comprising:
a substrate; and
an outer layer disposed on the substrate wherein the outer layer comprises a fluoroplastic matrix having dispersed therein aerogel particles wherein the aerogel particles comprise from about 1 weight percent to about 5 weight percent wherein a surface energy of the outer layer is less than about 10 $mN/m^2$.

17. The fuser member of claim 16, wherein the fluoroplastic is selected from the group consisting of polytetrafluoroethylene (PTFE); perfluoroalkoxy polymer resin (PFA); copolymer of tetrafluoroethylene (TFE) and hexafluoropropylene (HFP); copolymers of hexafluoropropylene (HFP) and vinylidene fluoride (VDF or VF2); terpolymers of tetrafluoroethylene (TFE), vinylidene fluoride (VDF), and hexafluoropropylene (HFP); and tetrapolymers of tetrafluoroethylene (TFE), vinylidene fluoride (VF2), and hexafluoropropylene (HFP).

18. The fuser member of claim 16, wherein the aerogel particles comprise a material selected from the group consisting of silica, carbon, alumina, titania and zirconia.

* * * * *